United States Patent
Dull

(10) Patent No.: US 9,044,904 B2
(45) Date of Patent: Jun. 2, 2015

(54) EXPANDABLE SURFACE BREATHER AND METHOD

(75) Inventor: Kenneth Marvin Dull, Pullayup, WA (US)

(73) Assignee: THE BOEING COMPANY, Chicago, IL (US)

( * ) Notice: Subject to any disclaimer, the term of this patent is extended or adjusted under 35 U.S.C. 154(b) by 49 days.

(21) Appl. No.: 13/298,873

(22) Filed: Nov. 17, 2011

(65) Prior Publication Data

US 2013/0126386 A1 May 23, 2013

(51) Int. Cl.
*B28B 5/00* (2006.01)
*B29C 70/44* (2006.01)
*B29C 37/00* (2006.01)
*B26F 1/18* (2006.01)
*B29C 70/54* (2006.01)
*B26D 3/12* (2006.01)

(52) U.S. Cl.
CPC ............. *B29C 70/44* (2013.01); *B29C 37/0064* (2013.01); *B26F 1/18* (2013.01); *B29C 70/546* (2013.01); *B26D 3/12* (2013.01); *Y02T 50/433* (2013.01); *Y02T 50/43* (2013.01)

(58) Field of Classification Search
USPC ......... 264/1.7, 413, 45.1, 45.2, 46.8, 48, 628, 264/629, 632, 642, 655, 139, 152, 153, 154, 264/155, 156, 163, 241, 293, 87, 510, 511, 264/553, 566, 568, 571, 101, 102, 678, 264/145–147

See application file for complete search history.

(56) References Cited

U.S. PATENT DOCUMENTS

| | | | |
|---|---|---|---|
| 4,311,661 A * | 1/1982 | Palmer | 264/510 |
| 5,709,893 A | 1/1998 | McCarville et al. | |
| 5,804,021 A * | 9/1998 | Abuto et al. | 156/252 |
| 6,254,812 B1 | 7/2001 | Goodridge et al. | |
| 6,818,159 B2 | 11/2004 | Hinz | |
| 6,861,017 B1 | 3/2005 | McCarville et al. | |
| 2002/0020934 A1 | 2/2002 | Hinz | |
| 2004/0209042 A1* | 10/2004 | Peacock | 428/136 |
| 2006/0252342 A1* | 11/2006 | Davis | 450/41 |
| 2007/0122590 A1* | 5/2007 | Lalvani | 428/136 |
| 2008/0176036 A1* | 7/2008 | Mitchell | 428/136 |
| 2008/0210372 A1 | 9/2008 | Cumings et al. | |
| 2011/0027095 A1 | 2/2011 | Jensen | |
| 2011/0209812 A1 | 9/2011 | Bansal et al. | |

FOREIGN PATENT DOCUMENTS

| | | |
|---|---|---|
| EP | 0371891 A1 | 6/1990 |
| FR | EP0371891 * | 6/1990 |
| GB | 804262 A | 11/1958 |
| GB | 2099306 A | 12/1982 |
| WO | WO00/06341 A1 | 2/2000 |
| WO | WO2005053939 A1 | 6/2005 |
| WO | WO2008137952 * | 11/2008 |

OTHER PUBLICATIONS

EP search report dated Mar. 4, 2013 regarding application 12193104.2-1703, reference NAM/P124590EP00, applicant The Boeing Company, 5 pages.

* cited by examiner

Primary Examiner — Stella Yi
(74) Attorney, Agent, or Firm — Yee & Associates, P.C.

(57) ABSTRACT

A breather for use in vacuum bag processing a composite part comprises a sheet of permeable material having at least one slit therein.

18 Claims, 8 Drawing Sheets

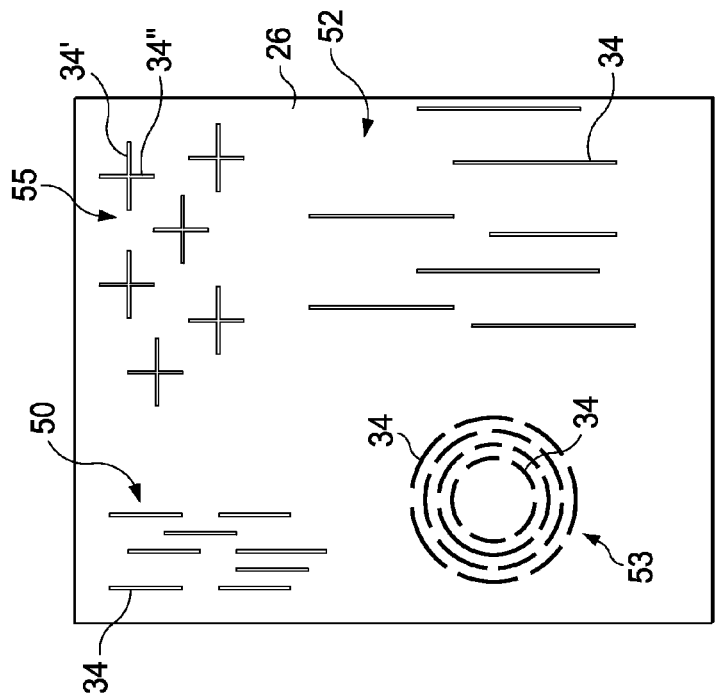
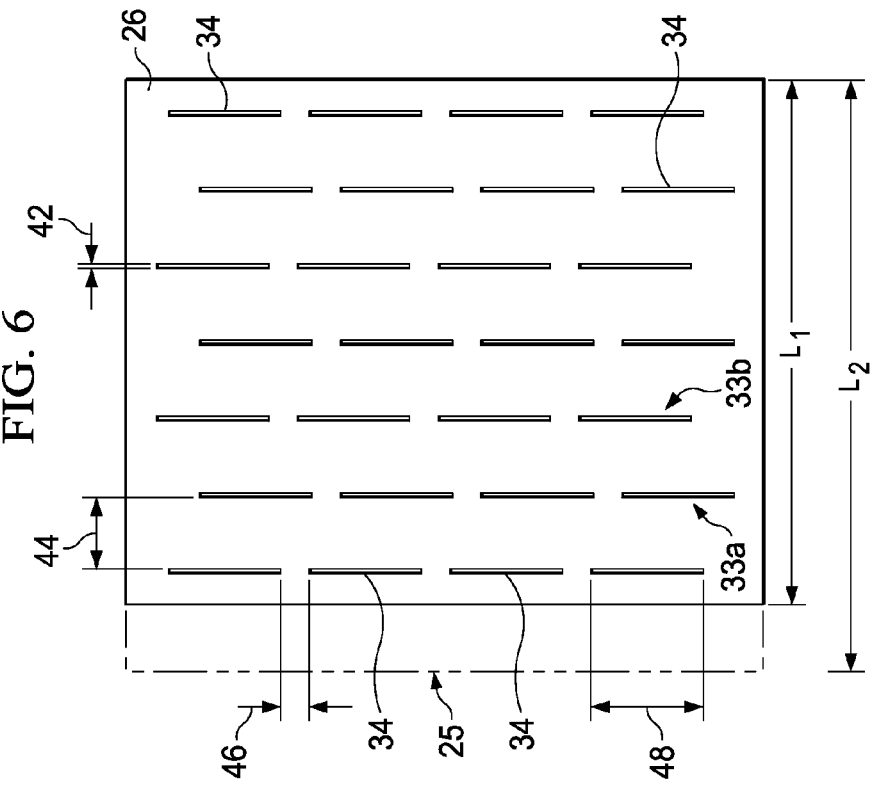

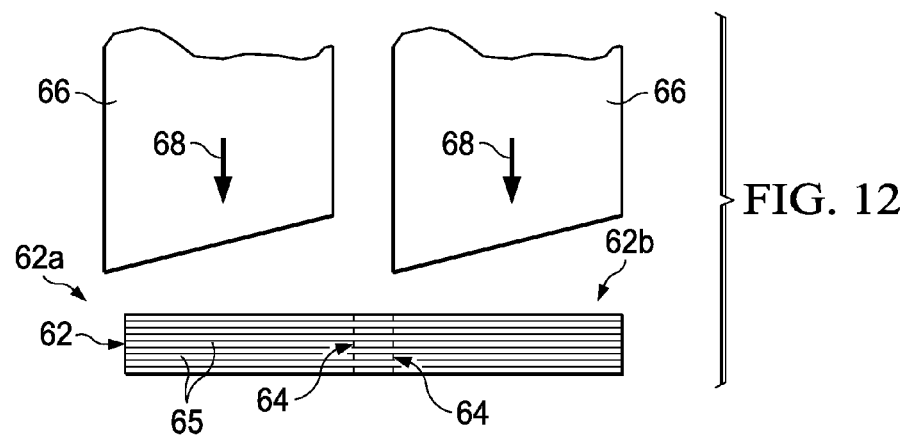
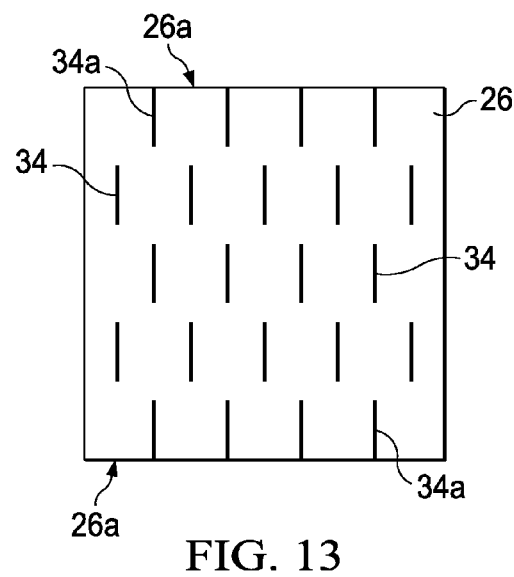
FIG. 12
FIG. 13

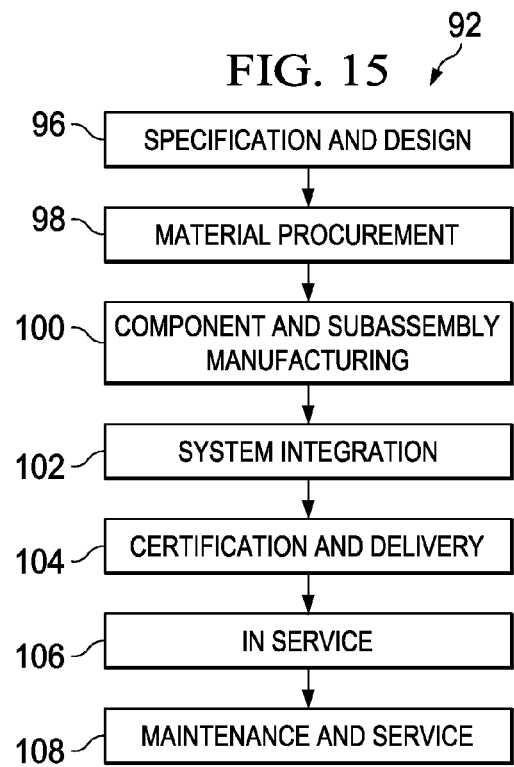
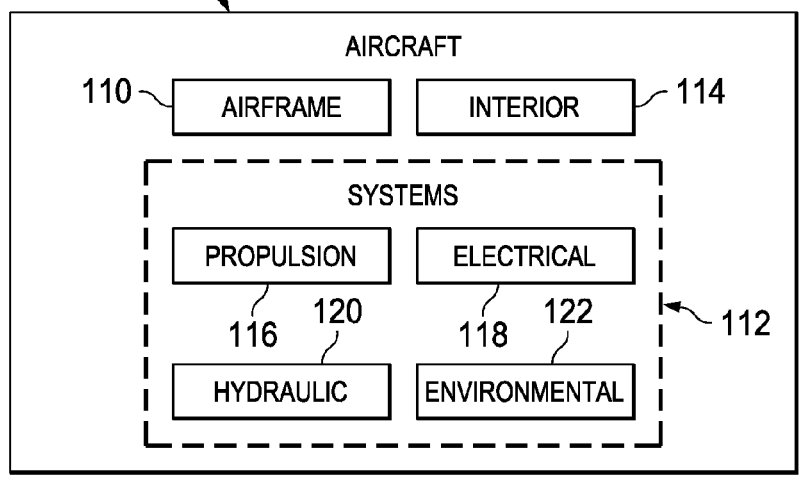

EXPANDABLE SURFACE BREATHER AND METHOD

BACKGROUND INFORMATION

1. Field

The present disclosure generally relates to vacuum bag equipment and supplies used to fabricate composite parts, and deals more particularly with an expandable surface breather that conforms to complex contoured surfaces of part layup.

2. Background

During the fabrication of composite parts, surface breathers may be positioned over a surface of a part layup that is subsequently processed under vacuum beneath a sealed vacuum bag. The breather provides a generally uniform breathing path on the surface of the layup that allows air and volatiles to escape from the layup during compaction and curing processing cycles. Removing air and volatiles is desirable in order to reduce part porosity and improve part performance. Breathers typically comprise polyester or nylon, non-woven materials in various weights and thicknesses that are cut to size for a particular application.

Covering part layups with breather materials is difficult where the part contains complex surface contours formed by part features. Larger pieces of breather material placed over these features may gap over, also known as bridging, rather than conform to the surface features. In order to avoid these gaps, breather materials are cut into multiple individual strips of varying widths which are carefully placed on and around complex contoured surface features in order to substantially completely cover the part layup without bridging. The use of multiple breather strips to cover a part layup is time consuming and may result in material waste, particularly where the part layup is very large and has complex contours.

Accordingly, there is a need for a one-piece breather that may be quickly and easily draped over the entire surface area of a part layup and which conforms to complex part contours during vacuum bag processing. There is also a need for a method of fabricating composite parts that reduces labor costs and material waste, and which avoids bridging of breather materials.

SUMMARY

The disclosed surface breather may comprise a single sheet of nonwoven breather material that is adapted to cover the entire area of a composite part layup, and conform to complex surface contours of the part. Use of a single breather sheet reduces the amount of labor required to install breather materials, and may reduce material waste resulting from the need for cutting breather materials into various sized strips. Multiple slits are cut in a single sheet of breather material. The slits allow the breather sheet to expand by stretching to a length longer than its original length. During the compaction process, the slits expand allowing the breather sheet conform to surface features and contours on the part. The slits may be formed using common cutting techniques and may have various dimensions, shapes and orientations that tailor one or more portions of the sheet to expand, as needed.

According to one disclosed embodiment, a breather is provided for using a vacuum bag processing a composite part, comprising a sheet of permeable material adapted to be placed over the part and having at least one slit therein. The sheet of permeable material includes a plurality of slits passing substantially through the thickness of the sheet, wherein each of the slits is expandable. In one embodiment, at least some of the slits are generally parallel to each other and may be distributed generally uniformly across the sheet. In one embodiment, the slits are arranged in a plurality of adjacent rows, and the slits in each of the rows are offset from the slits in the adjacent rows.

According to another embodiment, a breather is provided for allowing air and volatiles to escape from a composite part having a contoured surface during vacuum bag processing. The breather comprises a sheet of permeable material adapted to be stretched over the part within a vacuum bag. The breather is expandable to conform to the surface contours of the part when a vacuum bag applies compaction pressure to the part. A sheet of permeable material includes a plurality of expandable slits which allow the sheet o to expand during the compaction process. In one embodiment, each of the slits is elongate and has a longitudinal axis. The slits are expandable in a direction substantially transverse to the longitudinal axis. The sheet of permeable material has an area covering substantially the entire part.

According to still another embodiment, a method is provided of fabricating an expandable breather for vacuum bagged processing a part. The method comprises forming at least one slit in a sheet of breather material. This method may further comprise forming a plurality of slits in the sheet of material cutting slits in the sheet. In one embodiment, the slits may include folding the sheet of breather material over onto itself to form a plurality of stack layers, and making a plurality of cuts through the stack layers.

According to a further embodiment, a vacuum bag assembly for compacting a composite part is provided having a contoured surface. The vacuum bag assembly comprises a tool adapted to have the composite part placed thereon, and a vacuum bag adapted to be sealed to the tool and evacuated for compacting the part. The vacuum bag assembly further comprises a breather between the part and the bag for allowing air and volatiles to escape from the part. The breather substantially covers the entire area of the part and includes at least a portion expandable to conform to surface contours of the part when the vacuum bag is evacuated. The breather includes a sheet of nonwoven material and the expandable portion of the breather includes a plurality of expandable slits.

According to still another embodiment, a method is provided of fabricating a composite part having a complex, contoured surface. The method comprises assembling a composite ply layup, forming slits in a breather, placing a breather over the composite ply layup, vacuum bagging the composite ply layup and the breather, and compacting the ply layup using the vacuum bag. Placing the breather over the ply layup includes draping a single sheet of breather material over the entire area of the ply layup. Forming the slits in the breather includes making cuts in areas of the breather that allow the breather to conform to contoured surfaces of the composite part during compaction of the ply layup by the vacuum bag.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed

FIG. 6 is an illustration of a plan view of the surface breather shown in FIG. 1, showing additional details of the slits.

FIG. 7 is an illustration of a plan view of an alternate embodiment of the surface breather employing various configurations of the slits.

FIG. 12 is an illustration of a section view taken along the line 12-12 in FIG. 11, and also showing cutters.

FIG. 13 is an illustration similar to FIG. 8 but showing the slits having been cut sheet by the method shown in FIGS. 8-12.

FIG. 15 is an illustration of a flow diagram of aircraft production and service methodology.

FIG. 16 is an illustration of a block diagram of an aircraft.

DETAILED DESCRIPTION

Figure 1:
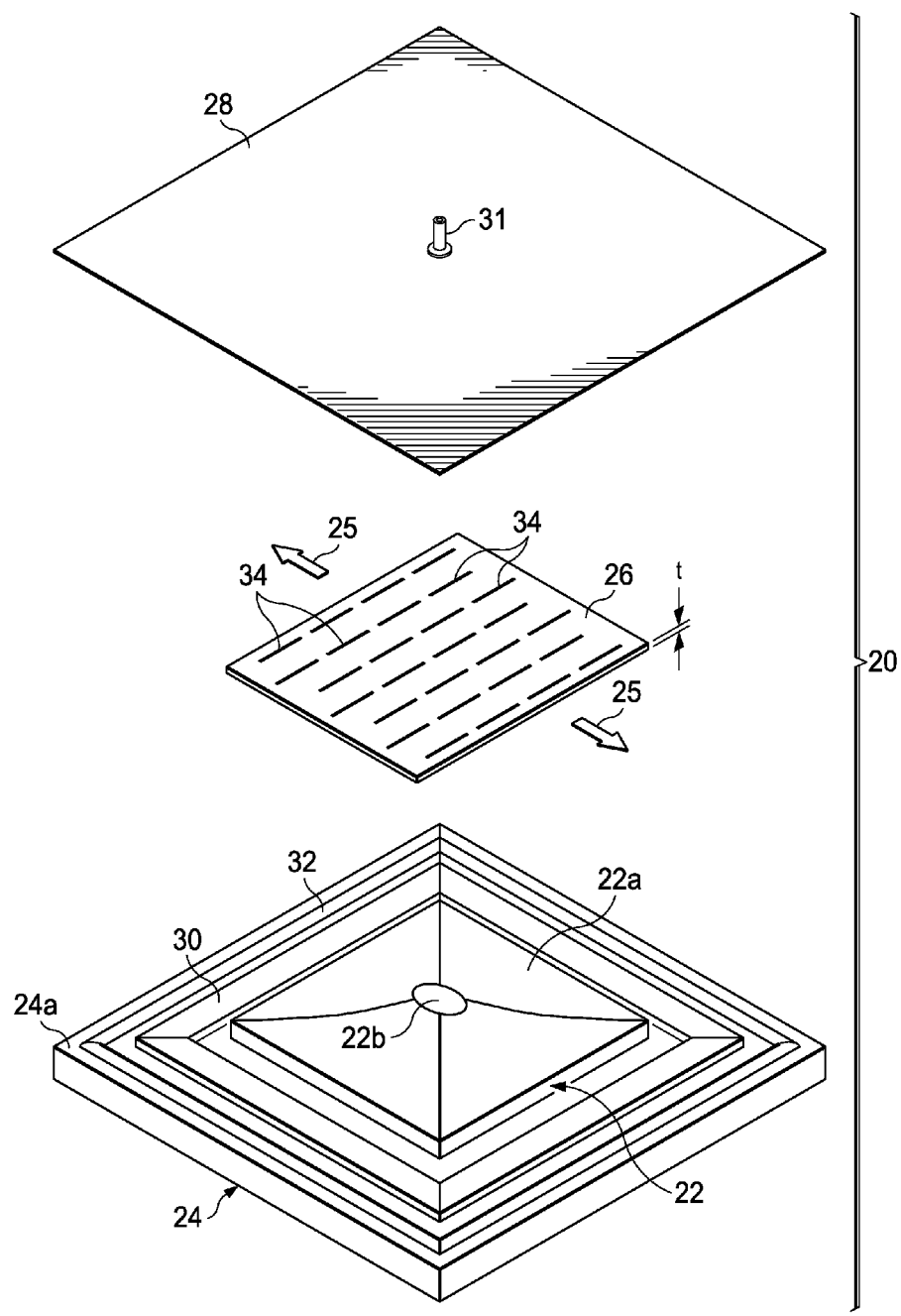
FIG. 1 is an illustration of a perspective view of a vacuum bag assembly employing the disclosed surface breather.

Referring first to FIG. 1, a vacuum bag assembly 20 may be used to form, compact, and/or consolidate a composite part layup 22. Vacuum bag assembly 20 broadly comprises a tool 24, a sheet 26 of breather material, flexible vacuum bag 28, and an edge breather 30. The vacuum bag 28 may have one or more outlet ports 31 that allow evacuation of air and volatiles from the bag 28 during processing. In the illustrated embodiment, the composite part layup 22 has complex contoured surfaces comprising four curved sides 22a converging into a generally flat top 22b. The composite part layup 22 shown in FIG. 1 is merely illustrative of a wide range of composite parts having simple or complex contoured surfaces and/or one or more curved sides. The tool 24 includes a generally flat tool surface 24a however in other embodiments, the tool surface 24a may have one or more curves or contours, depending upon the geometry of the composite part being fabricated.

The edge breather 30 surrounds the outer edges of the composite part layup 22 and functions to allow air and volatiles to escape from the part layup 22 when it is heated and compacted. The sheet 26 of breather material, which may hereafter be referred to as a sheet 26 or a breather sheet 26, covers substantially the entire surface area of the part layup 22 and may be formed of a conventional, permeable, non-woven material such as nylon or polyester which allows air and volatiles to pass therethrough. As will be discussed later in more detail, the sheet 26 of breather material includes a plurality of substantially parallel slits 34 therein which pass through the thickness t of the sheet 26 and function to allow the sheet to expand by stretching 25 thereby enabling the breather sheet to 26 readily conform to the contoured surface areas 22a, 22b. The vacuum bag 28 may comprise a conventional flexible bag or membrane that is sealed to the tool surface 24a by an edge sealant 32. Advantageously, as will be discussed below, a single sheet 26 is draped over the part layup 22 during assembly of the component shown in FIG. 1, eliminating the need to cut and place individual strips of breather material over and around the contoured surface areas 22a, 22b, and thus reducing the time required to prepare the layup 22 for vacuum bag processing. While a single breather sheet 26 is used in the illustrated embodiment to cover the entire area of the part layup 22, in other applications, the advantageous benefits of the disclosed embodiments may be realized by using more than one of the breather sheets 26 to cover a part layup.

Figure 2:
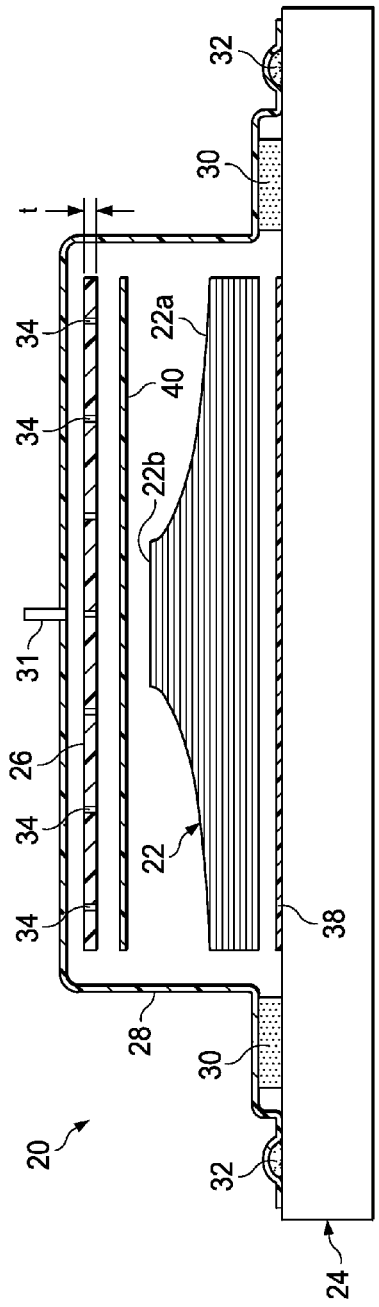
FIG. 2 is an illustration of a partially exploded, sectional view showing further details of the vacuum bag assembly depicted in FIG. 1.
Figure 3:
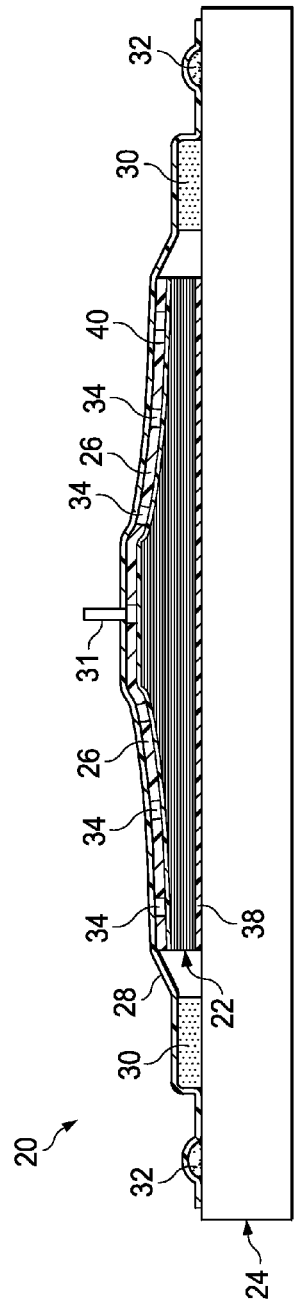
FIG. 3 is an illustration similar to FIG. 2, but after a vacuum has been drawn in the vacuum bag.

FIG. 2 shows additional components of the vacuum bag assembly 20 illustrated in FIG. 1. Optional peel plies 38, 40 may be placed on the top and bottom of the part layup 22. Also, a release film (not shown) may be placed on top of the peel ply 40, and one or more caul plates (not shown) may be placed either on top of the layup 22, beneath the vacuum bag 20, or on top of the vacuum bag 20 in order to distribute compaction pressure to various features of the part layup 22. FIG. 3 illustrates a vacuum bag assembly 20 after a vacuum has been drawn within the bag 28. Evacuation of the bag 28 causes the bag 28 to force the breather sheet 26 down onto to the contoured surfaces 22a, 22b of the part layup 22 while compacting the part layup 22. Evacuation of the bag 28 also causes air and volatiles to be drawn out of the part layup 22. The escaping air and volatiles pass through the breather sheet 26 and exit the bag 28 through the outlet port 31. During the evacuation of the vacuum bag 28, the bag 28 forces the sheet 26 of breather material down onto the contoured surfaces 22a, 22b of the part layup 22. The atmospheric pressure applied by the bag 28 to the breather 26 causes the slits 34 to expand which in turn allow the sheet 26 of breather material to expand and conform to the contoured surfaces 22a, 22b as required.

Figure 5:
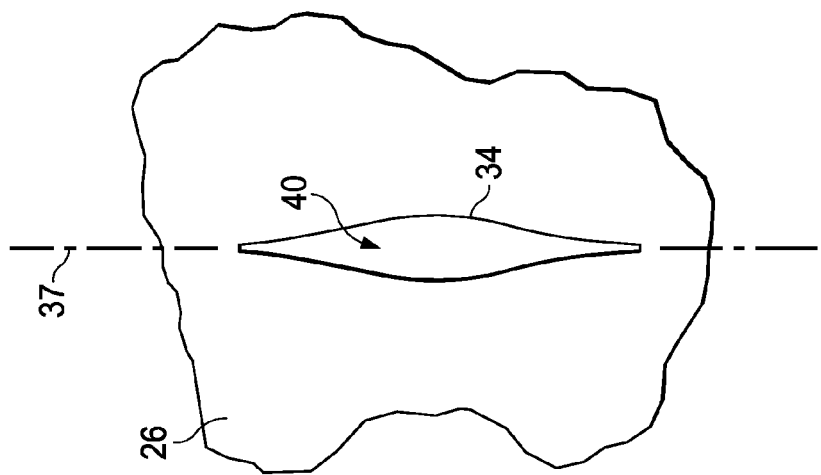
FIGS. 4 and 5 are illustrations respectively showing one of the slits in the breather material before and after the slit has been expanded.
Figure 4:
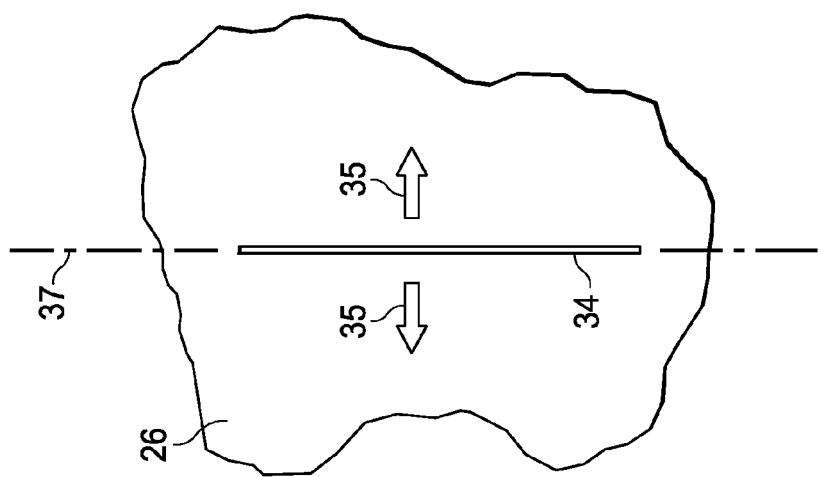

Referring particularly to FIGS. 4 and 5, each of the slits 34 is elongate and has a longitudinal axis 37. As the vacuum bag 28 presses the sheet 26 of breather material down onto the part layup 22, the slits 34 expand 35 and splay or gap open at 40 (FIG. 5), allowing the areas of the sheet 26 in proximity to the slits 34 to conform to the local contours of the part layup 22. The slits 34 expand in a direction transverse to the longitudinal axis 37 of the slit 34.

Referring now to FIG. 6, expansion of the slits as shown in FIGS. 4 and 5, allows the sheet 26 to expand by stretching from its original length $L_1$ to a longer length $L_2$. The size, number, location and shape of the slits 34 may vary, depending upon the application and the surface contours and features of the composite part layup 22. FIG. 6 illustrates only one of many possible layout arrangements of the slits 34. In FIG. 6, the slits 34 are arranged in adjacent, substantially parallel rows 33a, 33b wherein the slits 34 in the adjacent rows 33a, 33 are offset from each other, thereby staggering the slits 34 relative to each other. Staggering of the slits 34 in this manner may promote more uniform stretching of the breather sheet 26. The length 48 of each of the slits 34, as well as the distance 46 between slits in adjacent rows 33a, 33b along with the distance 44 between the rows 33a, 33b may all vary, depending upon the application. Also, the width 42 of each of the slits 34 may vary. For example, in one embodiment, the width 42 of each of the slits 34 may be nearly the same as the thickness of a cutter (not shown) used to form the slit 34. However, in other embodiments, the slits 42 may have a width that is greater than that of the cutter, so that the slits 34 comprise slot-like openings in the breather sheet 26. While the embodiment shown in FIG. 6 illustrates slits 34 that are substantially parallel to each other, in other embodiments, the slits 34 may be non-parallel.

As previously noted, the size, shape and location, as well as the number of the slits 34 vary depending upon the application. For example, referring to FIG. 7, an area 50 of a breather sheet 26 may have parallel slits 34 that are substantially randomly arranged and may have the same or varying length 48 (FIG. 6). In another area 52 of the same breather sheet 26, the slits 34 may have a longer length 48, and may be fewer or greater in number than the slits 34 in area 50. In some embodiments, as previously noted, the slits 34 may have geometries other than straight lines. For example, in an area 53 of the breather sheet 26, slits 34 are each arcuate in shape and arranged in a circular pattern corresponding to a feature (not shown) of the part layup 22 that allows the breather sheet 26 to conform around the feature. In other embodiments, the breather sheet 26 may have one or more areas 55 that include intersecting pairs of expandable slits 34', 34'' which allow the breather sheet 26 to stretch in more than one direction, e.g. in orthogonal directions, depending on the relative angular orientations of the slits 34', 34''. In still other embodiments, more than two of the slits 34 may intersect each other which allow the breather sheet 26 to stretch in more than two directions.

Figure 8:
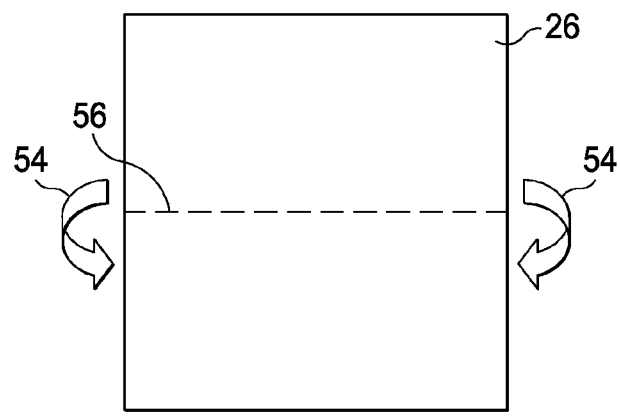
FIGS. 8-11 are illustrations of a plan view of a sheet of breather material, depicting successive steps used to form the slits.
Figure 9:
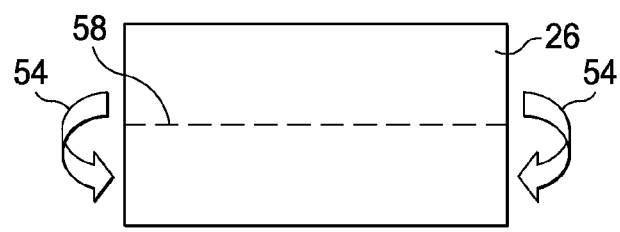
Figure 10:
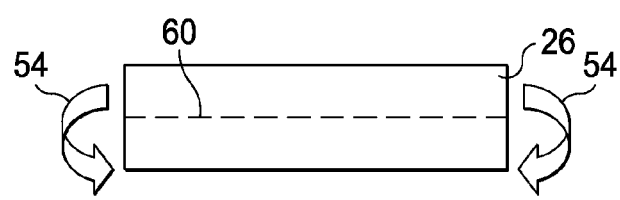
Figure 11:
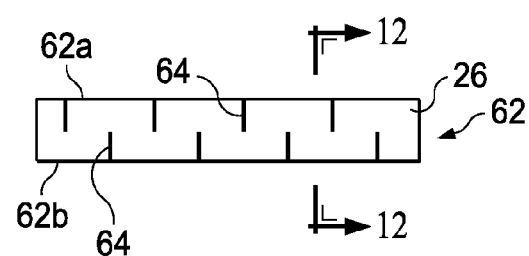

Attention is now directed generally to FIGS. 8-12 which illustrate the successive steps of one method of quickly and easily forming the slits 34 in the breather sheet 26. Referring to FIG. 8, a sheet 26 of suitable breather material is folded 54 over onto itself along a fold line 56. Next, as shown in FIG. 9, the folded sheet is folded again at 54 along a second fold line 58. Then, as shown at FIG. 10, the sheet 26 is folded a further time 54 along a fold line 60, to produce the folded stack 62 of layers 65 shown in FIGS. 11 and 12. The folding steps shown in FIGS. 8-10 may be repeated any number of times, depending upon the size and thickness of the breather sheet 26, and the particular application. Next, still referring to FIGS. 11 and 12, through cuts 64 are made through the folded stack 62, respectively on opposite edges 62a, 62b of the stack 62. The length of the cuts 64, their orientations and the spacing between them may vary, depending upon the application and the geometry of the composite part layup 22. FIG. 12 illustrates the use of a cutter 66 that may be vertically passed 68 through the folded stack 62 in order to make the cuts 64. The cutter 66 may include any suitable device, such as a Gerber cutter, or hand operated shears (both not shown). As can be appreciated from the above, forming the breather sheet 26 into a folded stack 62 results in multiple slits 34 being produced by each individual cut 64.

The finished breather sheet 26 having the slits therein is shown in FIG. 13. Using the cutting technique shown in FIGS. 11 and 12, some of the slits 34a extend to the edges 26a of the sheet 26. In other embodiments, cuts 64 shown in FIG. 11 may be placed inboard of the edges 62a, 62b of the stack 62, in which case slits 34a shown in FIG. 13 will be located inboard of the edges 26a of the sheet. The method of forming the slits 34 in the breather sheet 26 shown in FIGS. 8-12 is merely illustrative of a wide range of techniques that can be employed to form the slits 34. For example, the slits 34 could be formed by a laser cutter (not shown), or die cut using a press (not shown). However, the method illustrated in FIGS. 8-12 may be advantageous in some production environments because it can be performed quickly by lower skilled personnel using simple cutting implements.

Figure 14:
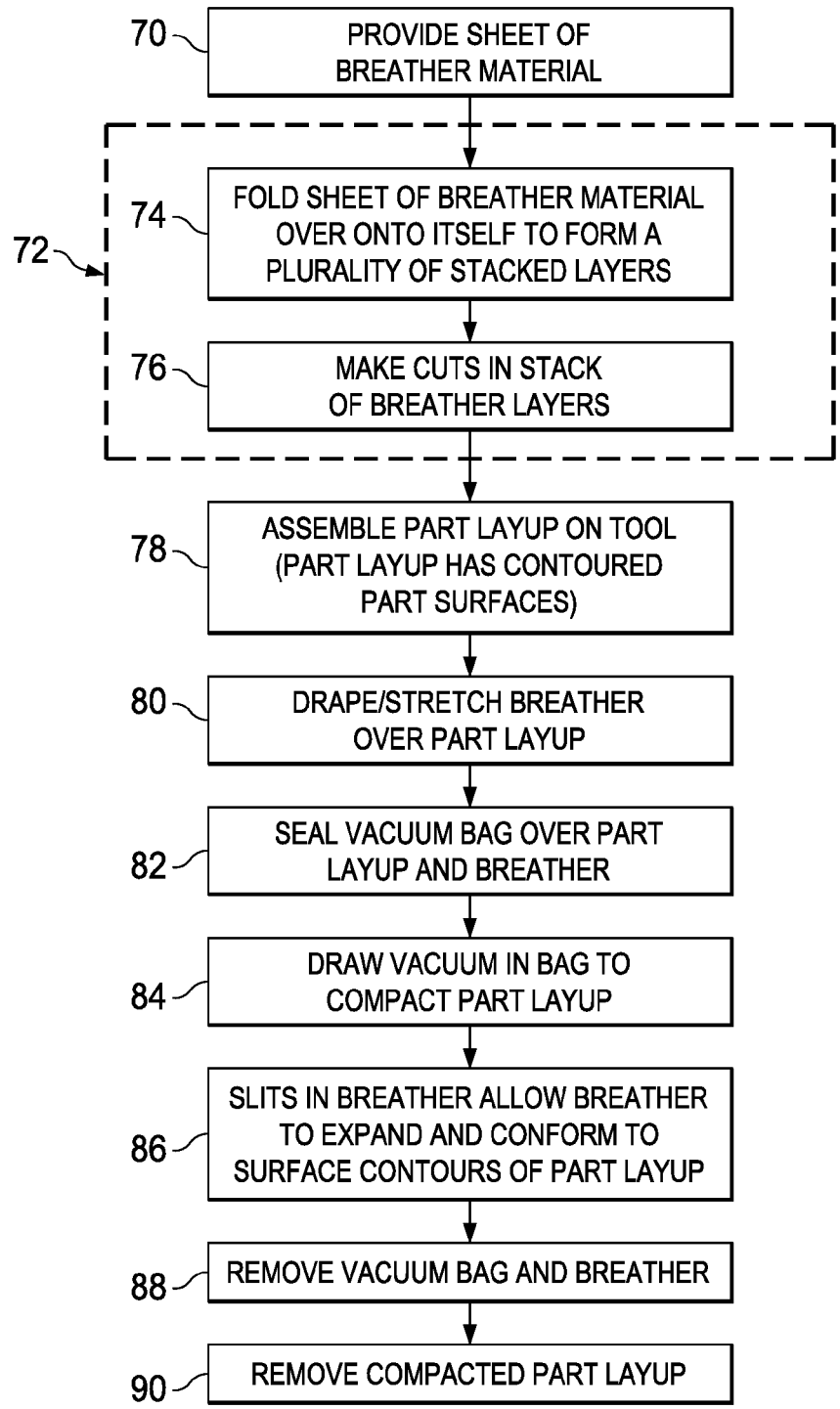
FIG. 14 is an illustration of a flow diagram of the steps of the method of fabricating a composite part using the disclosed expandable breather.

Attention is now directed to FIG. 14 which illustrates the steps of a method of fabricating a composite part having complex surface contours, using the previously describe breather sheet 26. Beginning at step 70, a sheet 26 of a suitable breather material is provided. As previously mentioned, the breather material may comprise a permeable, nonwoven material such as polyester or nylon which will allow air and volatiles to escape from the surface of the part layup 22. Advantageously, the sheet 26 is one piece of breather material having an area that is sufficient to substantially cover the entire area of the part layup. Next, as shown at 72, suitable cuts 64 are formed in the sheet of breather material provided in step 70. In one embodiment, as shown at 74, the breather sheet 26 is folded over onto itself one or more times to form a plurality of stacked layers 65. Then, as shown at 76, suitable cuts 64 are made through the stacked layers 65, thereby simultaneously forming multiple slits 34 during each individual cut through the stacked layers 65. The slits 34 are located in the breather sheet 26 in a manner that tailors or customizes the sheet 26 to the particular contours of the part layup 22. At 78, a composite part layup 22 is assembled on a tool 24 using conventional ply layup techniques, forming a part 22 that has one or more simple or complex contoured part surfaces 22a, 22b. Although not shown in FIG. 14, one or more peel plies, a release film, caul plates or other components commonly used in vacuum bag assembly may be installed after the part layup 22 has been completed at step 78. At step 80, the breather sheet 26 is draped over the part layup and stretched onto the surface of the part layup 22. Next, at 82, the vacuum bag 28 is sealed to the tool 24, covering the part layup 22 and the breather sheet. At 84, a vacuum is drawn in the bag 28, forcing the bag 28 down onto the breather sheet 26 and the part layup 22 in order to compact and/or consolidate the part layup 22. At 86, the slits 34 in the breather sheet 26 allow the breather sheet 26 to expand and conform to the surface contours 22a, 22b of the part layup 22. At step 88, the vacuum bag 28, breather 26 and other components of the vacuum bag assembly 20 are removed, following which the compacted part layup 22 may be removed at step 90.

Embodiments of the disclosure may find use in a variety of potential applications, particularly in the transportation industry, including for example, aerospace, marine, automotive applications and other application where automated layup equipment may be used. Thus, referring now to FIGS. 15 and 16, embodiments of the disclosure may be used in the context of an aircraft manufacturing and service method 92 as shown in FIG. 15 and an aircraft 94 as shown in FIG. 16. Aircraft applications of the disclosed embodiments may include, for example, without limitation, layup, compaction and curing any of a wide range of composite parts and components, such as, without limitation, stiffener members including beams, spars and stringers, to name only a few. During pre-production, exemplary method 92 may include specification and design 96 of the aircraft 94 and material procurement 98. During production, component and subassembly manufacturing 100 and system integration 102 of the aircraft 94 takes place. Thereafter, the aircraft 94 may go through certification and delivery 104 in order to be placed in service 106. While in service by a customer, the aircraft 94 is scheduled for routine maintenance and service 106, which may also include modification, reconfiguration, refurbishment, and so on.

Each of the processes of method 92 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16 the aircraft 94 produced by exemplary method 92 may include an airframe 110 with a plurality of systems 112 and an interior 114. Examples of high-level systems 112 include one or more of a propulsion system 116, an electrical system 118, a hydraulic system 120, and an environmental system 122. Any number of other systems may be included. Although an aerospace example is shown, the principles of the disclosure may be applied to other industries, such as the marine and automotive industries.

Systems and methods embodied herein may be employed during any one or more of the stages of the production and service method 92. For example, components or subassemblies corresponding to production process 100 may be fabricated or manufactured in a manner similar to components or subassemblies produced while the aircraft 94 is in service 106. Also, one or more apparatus embodiments, method embodiments, or a combination thereof may be utilized during the production stages 100 and 102, for example, by substantially expediting assembly of or reducing the cost of an aircraft 94. Similarly, one or more of apparatus embodiments, method embodiments, or a combination thereof may be utilized while the aircraft 94 is in service, for example and without limitation, to maintenance and service 108.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating an expandable breather for vacuum bag processing a part, comprising:
   folding the sheet of breather material over onto itself to form a plurality of stacked layers; and
   making a plurality of cuts through the stacked layers so as to form a plurality of slits in the sheet of breather material, the plurality of cuts including through cuts made through the stacked layers on opposite edges of the stack, the plurality of slits configured to expand under vacuum so that the expandable breather transitions from a first length to a second length, the breather material comprising a single sheet of nonwoven material, the slits comprising through cuts in the sheet of breather material, the breather material comprising nylon or polyester.

2. The method of claim 1, further comprising:
   forming a first plurality of the slits in the sheet of breather material substantially parallel to a first axis; and
   forming a second plurality of slits in the sheet of breather material substantially parallel to a second axis, the first axis differently aligned from the second axis.

3. The method of claim 2, wherein forming the slits is performed by cutting slits through the sheet of breather material both along the opposite edges of the plurality of stacked layers and inboard of the edges of the plurality of stacked layers.

4. The method of claim 2, wherein forming the slits is performed by making a first plurality of cuts in generally parallel orientation through the sheet of breather material and a second plurality of cuts at a different orientation from the first plurality of cuts, the sheet of breather material comprising a permeable material.

5. A method of fabricating a composite part having a complex contoured surface, comprising:
   assembling a composite part layup;
   folding a sheet of breather material over onto itself on a first fold line to form a first plurality of stacked layers;
   folding the first plurality of stacked layers over onto itself on a second fold line to form a second plurality of stacked layers;
   making a plurality of cuts through the stacked layers so as to form a plurality of slits in the breather, the breather comprising a single sheet of nonwoven permeable material, the slits comprising through cuts in the breather, the breather material comprising nylon or polyester;
   placing the breather over the composite part layup;
   vacuum bagging the composite part layup and the breather, the plurality of slits configured to expand under vacuum so that the breather expands from a first length to a second length; and
   compacting the part layup using the vacuum bag.

6. The method of claim 5, wherein placing the breather over the part layup includes stretching the breather.

7. The method of claim 5, wherein placing the breather over the part layup includes draping a single sheet of breather material over the entire area of the part layup.

8. The method of claim 5, wherein forming the slits in the breather includes making cuts in areas of the breather that allow the breather to conform to contoured surfaces of the composite part during compaction of the part layup by the vacuum bag.

9. The method of claim 1, the plurality of slits are elongate and oriented on a longitudinal axis, and wherein the plurality of slits are configured to expand in a direction substantially transverse to the longitudinal axis.

10. The method of claim 1, wherein the sheet of breather material consists essentially of a nonwoven permeable material selected from one of polyester or nylon.

11. The method of claim 1, wherein:
   the plurality of slits are arranged in a plurality of adjacent rows, and
   the slits in each of the rows are offset from the slits in the adjacent rows.

12. The method of claim 1, wherein at least certain of the plurality of slits are arcuate in shape.

13. The method of claim 5, wherein the plurality of slits have different lengths, a first number of slits are cut both along opposite edges of the second plurality of stacked layers and a second number of slits are cut inboard of the edges of the second plurality of stacked layers.

14. The method of claim 5, wherein the part includes contoured areas and at least some of the slits are distributed generally uniformly in areas of the sheet that are required to conform to the contoured areas of the part.

15. The method of claim 5, wherein:
   the sheet of breather is stretchable in at least one direction and the at least one slit is expandable in the at least one direction.

16. A method of fabricating an expandable breather for vacuum bag processing a part, comprising:
   folding a sheet of breather material over onto itself to form a plurality of stacked layers;
   making a plurality of cuts through the stacked layers, the plurality of cuts having a different orientation such that forming a first plurality of slits in a breather sheet, the breather sheet comprising a single sheet of nonwoven permeable material consisting essentially of nylon or polyester, the first plurality of slits are elongate and oriented substantially parallel to a first axis, the plurality of slits configured to expand under vacuum so that the breather sheet transitions from a first length to a second length in a first direction; and forming a second plurality of slits in a breather sheet, the second plurality of slits are elongate and oriented substantially parallel to a second axis, the second plurality of slits configured to expand under vacuum so that the breather sheet transitions from a first length to a second length in a second dimension, the first plurality of slits and the second plurality of slits comprising through cuts in the breather sheet.

17. The method of claim 16, wherein the first axis and the second axis are substantially orthogonal.

18. The method of claim 16, wherein at least a portion of the first plurality of slits intersect at least a portion of the second plurality of slits.

* * * * *